United States Patent [19]
Cutler

[11] 3,742,138
[45] June 26, 1973

[54] PREDICTIVE DELAYED ENCODERS

[75] Inventor: Cassius Chapin Cutler, Holmdel, N.J.

[73] Assignee: Bell Telephone Laboratories, Incorporated, Murray Hill, N.J.

[22] Filed: Aug. 30, 1971

[21] Appl. No.: 176,131

[52] U.S. Cl......... 178/68, 340/347 AD, 340/347 SH
[51] Int. Cl. ........................................... H03k 13/02
[58] Field of Search ..................... 178/68; 325/38 B; 340/347 AD, 347 SA

[56] References Cited

UNITED STATES PATENTS

| | | | |
|---|---|---|---|
| 3,631,520 | 12/1971 | Atal | 325/38 B |
| 3,628,148 | 12/1971 | Brolin | 325/38 B |
| 3,662,266 | 5/1972 | Limb | 325/38 B |
| 3,633,170 | 1/1972 | Jones | 325/38 B |
| 3,659,288 | 4/1972 | Taylor | 340/347 AD |
| 3,091,664 | 5/1963 | Tyrlick | 325/38 B |

*Primary Examiner*—Maynard R. Wilbur
*Assistant Examiner*—Jeremiah Glassman
*Attorney*—W. L. Keefauver

[57] ABSTRACT

In a feedback type encoder, predictive delay apparatus allows for the calculation of estimated encoding error one sampling period in advance of the sample being encoded. Each of a plurality of combinatorial means assembles a predicted error signal under conditions of hypothetical prospective output signals. In the embodiment shown, a one bit encoder is afforded exponential adaptation and double integration facilities in its feedback circuitry. The net result is a superior response to rapid directional changes in input analog signals with a substantial improvement in operational stability.

8 Claims, 17 Drawing Figures

PREDICTIVE DELAYED ENCODERS

BACKGROUND OF THE INVENTION

This invention relates to analog-to-digital conversion apparatus. More particularly, it relates to analog-to-digital and digital-to-analog predictive type converters.

Generally, signal converters may be divided into two separate classes: those which incode each individual analog sample in its entirety, and those which encode only the difference between succeeding samples. Members of this latter group of converters have been loosely designated as feedback coders, since they generally incorporate the principles of negative feedback, with priorly encoded digital output signals being processed by a feedback network to generate a facsimile signal which is fed back to be compared with subsequent input samples.

More particularly, feedback coders all utilize an amount of prediction. One type of feedback coders, called first order coders, includes delta modulators and differential pulse code modulators (DPCM). In first order coders, the operant prediction theory is that the next sample will be approximately equal to the previous sample. Thus, the predictive apparatus of first order coders generates as exactly as possible a replica of the previous analog sample. Higher order coders operate on the theory that the succeeding sample will differ from the previous sample by a predictable amount. Thus, the higher order coders generally seek to synthesize a prediction of the change which will be encountered between sampling times. Thus, it is proper to characterize first order type predictive coders as simulating the analog signal as it appeared at the previous sampling time, and the higher order type predictive encoders as simulating the analog signal as it will appear at the next sampling time. Since both types of feedback converters have particular relevance to the principles of the present invention, it is appropriate that both be described in somewhat more detail.

DESCRIPTION OF PRIOR ART TECHNIQUES

First order coders such as delta modulators and DPCM converters generally operate as follows. Prior to quantization, locally generated approximations deduced from priorly encoded samples are first subtracted from the next sample to be encoded. This subtraction yields a representation of the change (prediction error) in the analog signal between sampling times; the difference is then quantized and encoded as a digital output signal. Thereafter, this output signal is further incorporated into the locally generated approximation, and the next sample is processed similarly. The most common method for producing the locally generated approximation is integration, wherein digital output signals are simply integrated to produce a facsimile of the analog input with a delay of one sampling period. The facsimile consists of a series of sample voltages at regular intervals which approximate the form of the original signal. Before filtering, the reproduction appears as a staircase with "steps." At any given time, the facsimile is based only upon past (already transmitted) signals. Since simple integration (i.e., with a single stage of integration) is characterized by certain inadequacies with respect to tracking ability and quantizing noise, several improvements thereon have been developed.

One improvement in first order coders has featured the introduction of variable step sizes in the feedback circuitry. That is, rather than providing for uniform steps, a variable step size mechanism provides for a dynamic variation of the step sizes in response either to input or to output signals. This adaptive response facility has provided excellent operational flexibility. While large variety of methods have been suggested to provide adaptive step sizes, a recently disclosed one promises excellent characteristics. This method is described by N. S. Jayant in a March 1970 (Vol. 49, No. 3) Bell System Technical Journal article entitled "Adaptive Delta Modulation with a One Bit Memory." Jayant's coder, which will be designated hereinafter as a PQ coder, dynamically varies step sizes by maintaining in storage the immediately previous step size, and then, in response to output signal changes, multiplying it by one of two step size factors nominally designated P and Q. P and Q respectively correspond to cases of directional change or no directional change in the analog signal between consecutive sampling times. In this manner, PQ converters continuously adapt integration step sizes in accordance with the type of change demonstrated by the analog input signal. Even PQ coders, however, have demonstrated inadequacies with respect to the capability of adapting to sudden changes in the input signal.

In contrast with first order coders, which seek to determine an estimate of a future signal value only from the previous code value, higher order coders use previous values to synthesize a predicted error signal for subsequent input samples. Thus, instead of producing merely an approximation of the past analog signal, a plurality of priorly encoded samples is further combined, often by weighted averaging techniques, to produce an estimation of the next sample to be encoded. One example of this type of coder is shown in U. S. Pat. No. 2,905,756 to R. E. Graham. Another example of higher order coders features the addition of a second integrator in the feedback circuit. Significant operational improvements are obtained by modifying the integrators to allow a decay or leak of the accumulated signal in each integrator. Double integration coders, however, such as those described in U. S. Pat No. 2,605,361 to C. C. Cutler, have encountered difficulties with respect to operational stability, and have therefore seen relatively little application.

Generally, then, prior art feedback type encoders, both of the first order and the higher order species, embody a general operating theory. All rely upon a plurality of past samples, although the past samples are processed differently in each class. All utilize locally generated approximations obtained from a plurality of past samples to produce facsmilies which are in some way related to the next sample to be encoded. Moreover, all have demonstrated inadequacies with respect to signal-to-noise ratio and responsiveness to rapidly changing input signals. In particular, it appears that these inadequacies are causally related to the failure of the prior art encoders effectively to prepare for sudden changes in the analog signal by failing to advance their predictions more than one sampling period into the future.

While the prior art does show several attempts to account for signal changes more than one sampling period in the future, these efforts have been, by and large, unsuccessful. One such technique is to utilize delay elements at the input to enable the combination of subsequent input samples to be encoded. Another technique attempts to predict encoding errors more than one sampling period ahead by utilizing the statistics of the individual input signal. Neither technique, however, has yielded a satisfactory solution to the traditional problems of signal-to-noise ratio and adaptation to rigid signal changes.

SUMMARY OF THE INVENTION

The present invention provides a solution to the quantizing noise and adaptability problems of the various encoders of the prior art by affording a technique whereby possible alternative encoding errors more than one sampling period in the further may be calculated. That is, the principles of the present invention, by applying to higher order coders, such as double integration coders, the first orders coders' techniques of PQ adaptation, allow not only the determination of the coded approximations of the next sample, as certain of the prior art has also done, but additionally allow the use of these values along with the sample values themselves to calculate the possible encoding errors more than one sampling period ahead of the sample being encoded. Moreover, these calculations take into account varying, conditions of subsequent output signal production. For example, as the principles of the present invention are applied to one bit modulators, there is enabled the calculation of the quantizing error for the two samples following the sample being encoded under all possible binary output coders (i.e., 00, 01, 10, 11). Of course, this procedure can also be followed for more than two periods in the future.

The principles of the present invention are readily adaptable to delta modulators, differential pulse code modulators, and virtually any other type of encoder which utilizes integration or prediction apparatus in a feedback configuration with the basic quantizing apparatus.

In an illustrative embodiment of the present invention, a one bit predictive encoder is provided with PQ adaptation facilities similar to those described by Jayant, as well as with a double integration means as described in the aforementioned Cutler patent. A plurality of combinatorial circuits are employed which variously combine the integrated prior output signals, with at least one input sample value to be encoded, to produce the encoding errors under hypothetical output codes for samples not yet encoded. More particularly, prior output signals are appropriately weighted by the adaptation factors P and Q, as well as by the two integration feedback factors, hereinafter referred to as L and F. In fact, the outputs of these combinatorial circuits represent anticipated error of the encoded analog samples for each of the next two sample periods in the future under the conditions of each possible output signal combination. The estimated error signals are then processed by means of a weighted averaging procedure and the weighted average obtained thereby is quantized and transmitted as output signals, which are also fed back for subsequent error estimation.

It is a primary feature of the present invention that the signal-to-noise ratio of the encoded signals in well-known encoders is substantially improved. Moreover, this improvement is most graphically effective whenever the signal being encoded is in a state of rapid change. It is another feature of the present invention that these improvements are obtained without penalty to operational stability. In fact, prior art systems such as double integration modulators, which are previously considered only marginally stable, are rendered extremely stable by means of incorporating the principles of the present invention.

DETAILED DESCRIPTION

Figure 1A:
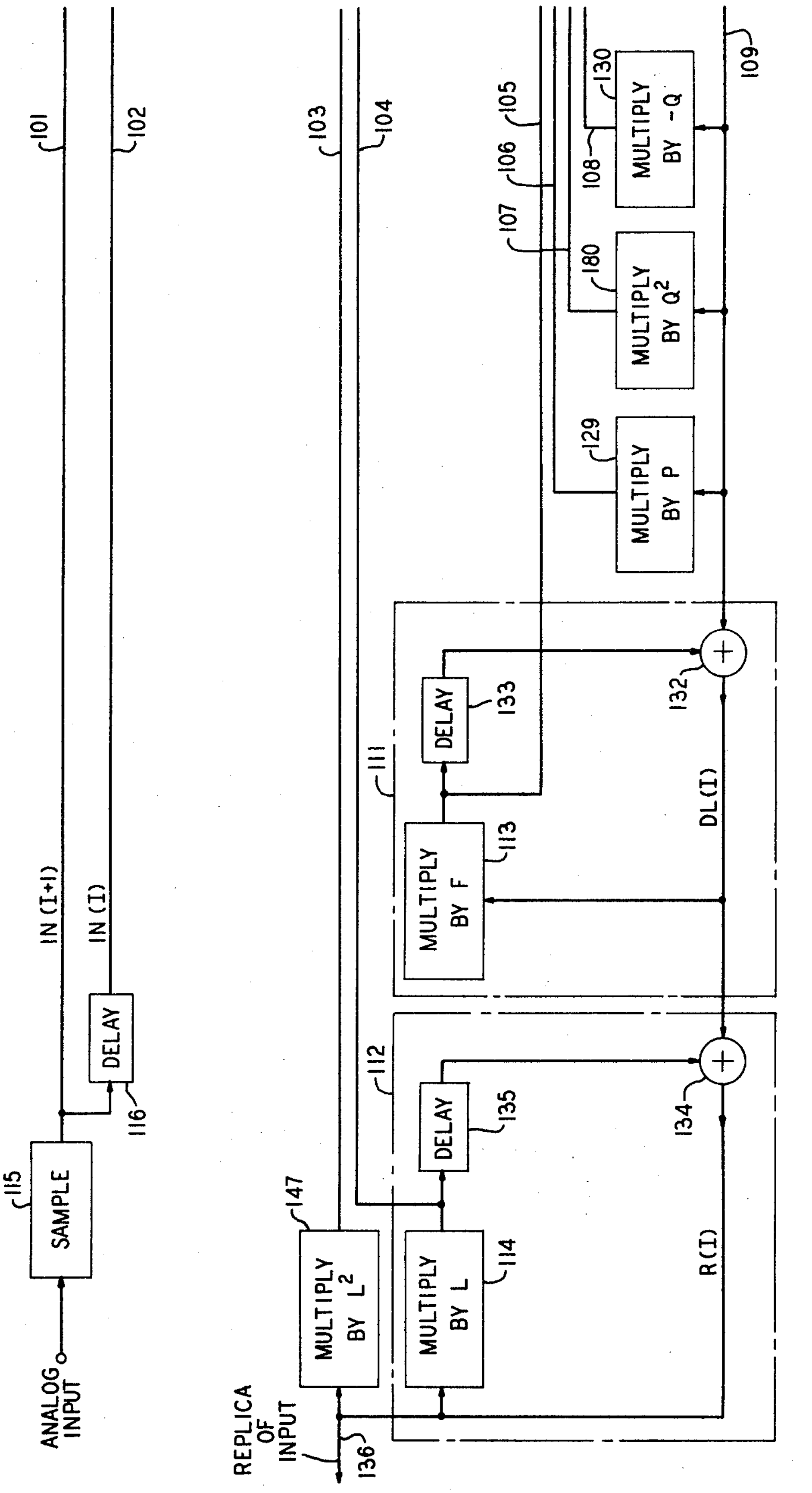
FIGS. 1A and 1B show a first illustrative embodiment of the present invention in block diagrammatic forms.
Figure 1B:
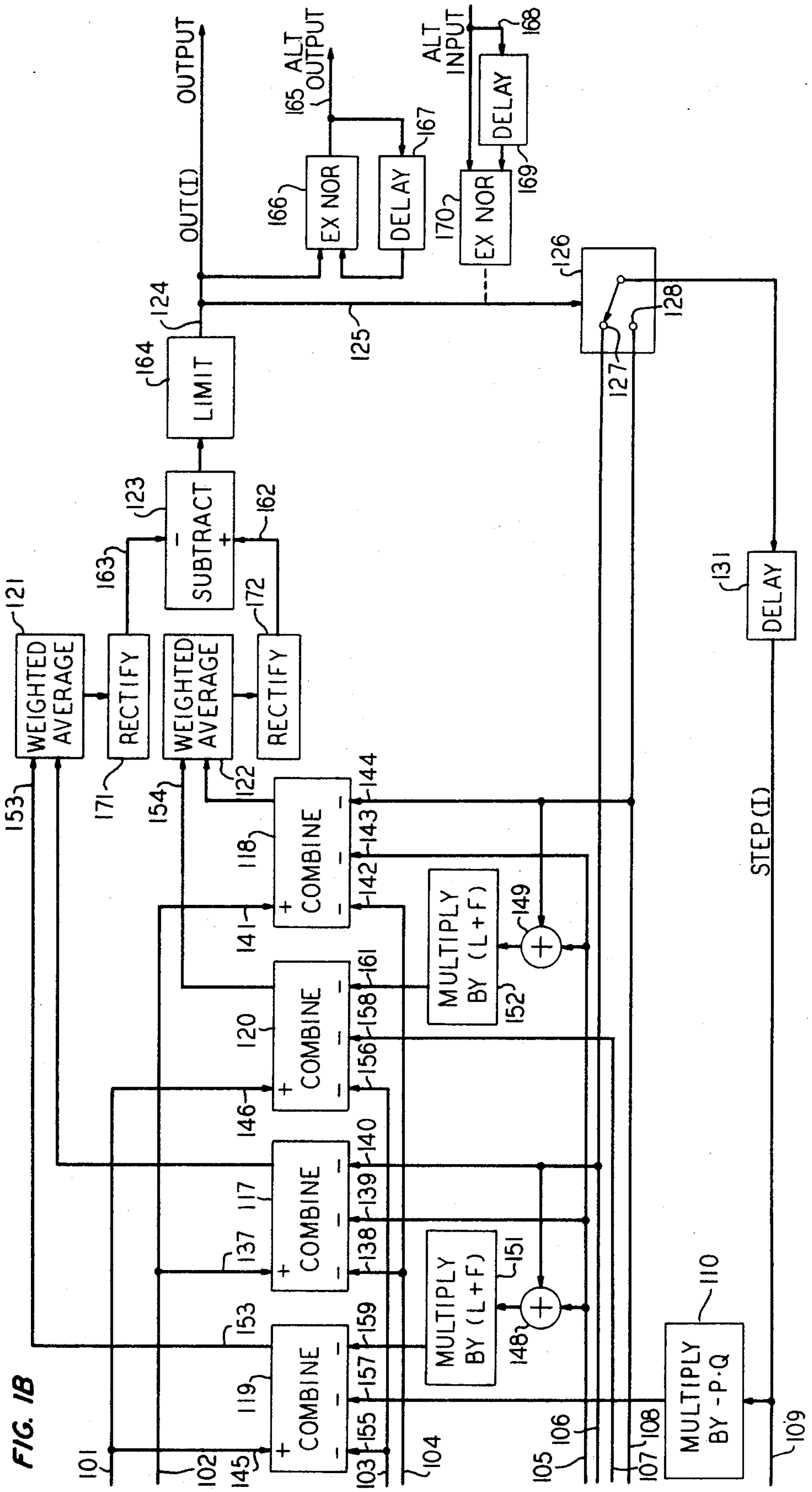

FIGS. 1A and 1B show in block diagrammatic form an illustrative embodiment of the present invention. These figures are connected by placing FIG. 1A to the left of FIG. 1B at the intersections of lines 101, 102, 103, 104 105, 106, 107, 108, and 109. The embodiment of FIGS. 1A and 1B is a one bit coder. That is, each input sample is represented at the output by a single binary digit, a logic "1" representing a directional change in the analog signal between sampling periods, and a logic "0" representing no change in direction between samples. In particular, the embodiment of FIGS. 1A and 1B is an adaptive encoder which changes integration step sizes in accordance with the principles described in the aforementioned Jayant Bell System Technical Journal article, i.e., it utilizes the principles of PQ adaptation. Accordingly, to encode an instant sample, the step size which was utilized for the previous sample is multiplied by the positive adaptation factor P if the instant sample is to be encoded the same as was the previous sample, or is multiplied by the negative adaptation factor Q if the instant sample is to be encoded differently than was the previous sample. Finally, the encoder of FIGS. 1A and 1B also incorporates the features of double integration. The first and second integration steps are represented respectively by blocks 111 and 112. It may be seen from FIG. 1A that each integrator includes a multiplier circuit (multiply by F 113, multiply by L 114). These multiplication steps allow for a "leak," or a limitation of the integration operations, thereby affording additional control over the adaptability of the encoder of FIGS. 1A and 1B to the parameters of the analog signal to be encoded.

An analog input signal is delivered to a sampler 115 which periodically samples the signal. To the output line 101 of the sampler 115, there is connected a delay element 116 which subjects each sample to a time delay of one sampling period. Accordingly, if the sample appearing at line 101 is designated IN(I+1), the sample at the output of delay element 116 is IN(I), the sample immediately previous to sample IN(I+1). The sample designated IN(I) is the one which at any given time is being encoded, while sample IN(I+1) is used by the encoder in the production of the various predictions of future encoding errors. Sample IN(I) is conveyed by means of line 102 to the positive inputs 137 and 141 respectively of combinatorial circuits 117 and 118. As will be apparent hereinafter, combinatorial circuits 117 through 120 perform the functions of addition and subtraction of the input quantities. In an analog system, they would be embodied as a plurality of summing amplifiers. Similarly, sample IN(I+1) is conveyed by means of line 101 to the positive inputs 145 and 146 of combinatorial circuits 119 and 120. As will be detailed hereinafter, combinatorial circuits 117 through 120 produce signals on the basis of which the coder determines the optimal code assignment. Hereinafter we refer to these signals as "hypothetical error" signals, because they represent the quantizing errors that would result from alternative choices of the next code element.

The hypothetical error signal outputs of combinatorial circuits 117 through 120 are conveyed to two weighted averaging circuits 121 and 122 which compute weighted averages of the signals presented at their inputs. More particularly, averaging circuit 121 produces an output which represents a predicted error under conditions of a hypothetical logic 0 for the next output, and averaging circuit 122 produces an output which represents the predicted error under the conditions of a hypothetical logic 1.

The output signals from each of the weighted averaging circuits are conveyed to a pair of rectification circuits 171 and 172. Rectification circuit 171 rectifies the weighted average hypothetical error signal from averaging circuit 121, and rectification circuit 172 rectifies the hypothetical error from averaging circuit 122. It is the purpose of the rectification circuits 171 and 172 to present to subtraction circuit 123 signals of the same (i.e., positive) polarity. The reason for this is that it is only the magnitude of encoding error which is sought to be minimized, irrespective of the direction of that error.

As will be detailed hereinafter, the output of rectifier 171 represents the magnitude of the quantization error for the case of a logic 0 output digit, while the output of rectifier 172 represents the error in magnitude for a logic 1 output digit. These values are deduced before the choice between a logic 0 and a logic 1 is made.

The predicted errors from circuits 171 and 172 are therefore conveyed to a subtraction circuit 123. The subtraction performed by circuit 123 determines which hypothetical error is the smaller. Thus, if the signal from circuit 171 is smaller, corresponding to a logic 0 output, the output of the subtraction circuit 123 will be positive; otherwise, its output will be negative, thereby indicating a smaller predicted error for a logic 1 output.

The error difference from subtract circuit 123 is conveyed to a limiting circuit 164. The limiting circuit 164 merely clamps the output from the subtraction circuit 123 to a corresponding fixed voltage of the same polarity. Thus, if the output of subtraction circuit 123 is positive in polarity, limit circuit 164 clamps output bus 124 to a fixed positive voltage for a short time. On the other hand, if the output from subtraction circuit 123 is negative, limiting circuit 164 briefly clamps output bus 124 to fixed negative voltage.

The voltage limited output of limiting circuit 164 comprises digital signals, the limiting voltages corresponding to the logic 1's and 0's and in fact comprising the output signal for the embodiment of FIGS. 1A and 1B. For the embodiment of FIGS. 1A and 1B, the positive limiting voltage corresponds to a logic 0 and the negative limiting voltage corresponds to a logic 1.

In addition, the output signals on bus 124 are coupled by way of line 125 to the control input of a switch 126 which is connected in the feedback circuitry of the encoder. It is envisioned that switch 126 be connected to terminal 127 when a logic 0 is produced on the output bus 124. Similarly, switch 126 is connected to terminal 128 when a logic 1 appears on the output bus 124. Since a positive output from subtract circuit 123 indicates the preferability of encoding the next sample as a logic 0, switch 126 is connected to terminal 127 whenever the output of subtract circuit 123 is positive. Similarly, switch 126 is connected to terminal 128 whenever the output of subtraction circuit 123 is negative.

As may be seen from FIGS. 1A and 1B, terminal 127 is connected to line 106 which comes from the output of multiplication circuit 129. Multiplication circuit 129 provides the function "multiply by the positive adaptation factor P." Similarly, terminal 128 is connected by means of line 108 to multiplication circuit 130, which represents the function "multiply by the negative adaptation factor "Q"". Thus, whenever a logic 0 appears on bus 124 indicating no change of direction of the input signal, switch 126 is connected to terminal 127, and the quantity at the input 109 of multiplication circuit 129 being appropriately multiplied by the positive adaptation factor P is transmitted through switch 126. Similarly, when a logic 1 appears at bus 124 indicating a change of direction of the analog signal, switch 126 is connected to terminal 128 and the quantity at the input 109 of multiplication circuit 130 being appropriately multiplied by negative adaptation factor Q is conveyed through switch 126.

The switch 126 is connected to the input of a delay element 131. Delay element 131 provides a one-sampling period delay to signals placed at its input, which are actually the step sizes of the encoder. Thus, if a step signal STEP(1) appears at the input of delay element 131 during sampling period I, it appears at the output of delay element 131 exactly one sampling period later. Since line 109 provides the input to the PQ multiplication circuits 129 and 130, the iterative PQ procedure follows therefrom. For example, if the output signal OUT(I−1) at time I−1 was a logic 0, the switch 126 was then closed to the positive terminal 127 and was thereby coupled to multiply-by-P circuit 129. Thus, the signal which appeared at switch 126 was the step value at line 109, STEP(I−1), multiplied by the increasing adaptation factor P. One sampling period later, that signal appears at the output of delay element 131. Thus, $$\mathrm{STEP}(I) = P \cdot \mathrm{STEP}(I-1) \text{ for } \mathrm{OUT}(I-1) = 0. \tag{1}$$

Similarly, for the case of OUT(I−1) being a logic 1, $$\mathrm{STEP}(I) = Q \cdot \mathrm{STEP}(I-1). \tag{2}$$

This operation therefore embodies the techniques of PQ adaptation. As will be made clear hereinafter, however, the use of PQ adaptation in FIGS. 1A and 1B is different from its use in the prior art.

Line 109 is also coupled to the first integrator 111. More particularly, the integrator 111 includes an adder 132, the multiplication-by-F circuit 113, and a one sampling period delay element 133. The output DL(I) of the adder circuit 132 during any given timing period is the step size signal STEP(I) on line 109 summed with the previously integrated quantity DL(I−1) multiplied by factor F at circuit 113 and delayed by one sampling period by delay element 133. Thus, the degree of feedback in the integrator 111 is controlled by the factor F. If F is equal to one, simple integration takes place, whereby each succeeding integration change is equal to the step-size change demonstrated at line 109. Variation of the factor F allows for a similar variation of the amount of feedback afforded in the integrator 111. Thus, the operation of integrator 111 may be designated analytically:

$$DL(I) = F \cdot DL(I-1) + STEP(I) \tag{3}$$

where DL(I) is the output of adder 132 at sampling period I, STEP(I) is the step size represented at line 109 at period I, F is the integration multiplication factor of multiplier 113, and DL(I−1) is the output of adder 132 from the previous sampling period, i.e., the $I-1^{th}$ period.

The second integrator 112 operates similarly to integrator 111. In particular, the second integrator 112 includes an adder 134, a multiplication circuit 114 which provides an integrating multiplication factor of L, and a delay element 135. Thus, by providing a second integration feedback factor, L, the second integrator 112 adds yet another increase of flexibility in assembling an accurate approximation of the analog input signal. The operation of the second integrator 112 may be analytically expressed as follows:

$$R(I) = L \cdot R(I-1) + DL(I) \tag{4}$$

where L is the second integration multiplication factor, R(I) is the output of adder 134 during sampling period I, R(I−1) is the previous output of the adder 134, and DL(I) is given by equation 3. The value R(I) at terminal 136 represents a replica of the input signal, since, with appropriate adjustment of the factors P, Q, F, and L, the entire feedback loop between switch 126 and terminal 136 can accurately simulate the analog input signal. The analytical expression for the operation of the entire feedback loop between switch 126 and terminal 136 may therefore be expressed as follows:

$$R(I) = L \cdot R(I-1) + F \cdot DL(I-1) + P\ STEP(I-1) \tag{5}$$

whenever the output digit OUT(I−1) at sampling time I−1 was a logic 0 and $$R(I) = L \cdot R(I-1) + F \cdot DL(I-1) - Q \cdot STEP(I-1) \tag{6}$$

whenever the output digit OUT(I−1) at sampling time I−1 was a logic 1. Of course, equations 5 and 6 represent the combination of equations 1 through 4.

Since equations 5 and 6 represent one aspect of the operation of the circuitry between switch 126 and terminal 136 of FIGS. 1A and 1B, it is clear that under certain conditions that apparatus may be used for standard delta modulation type encoding. It should be emphasized, however, that this is not the way in which the apparatus in the feedback loop of FIGS. 1A and 1B is used. Rather, the description of standard delta modulation is presented herein in order to distinguish the principles of the present invention insofar as they utilize well-known techniques such as PQ step adaptation and double integration to achieve novel results. Since standard delta modulation operation consists of subtracting a locally generated approximation from an input sample to yield a quantity error, the following equation results:

$$E(I) = IN(I) - A(I) \tag{7}$$

where E(I) represents the error signal dependent upon output signals up to OUT(I−1) which is subsequently quantized and transmitted as a single digit OUT(I), which may be a logic 1 or a logic 0. The same equation holds for more sophisticated coders: adaptive coders such as the PQ coders and coders utilizing multiple steps of integration. In equation 7, A(I) is a locally generated quantized approximation of the input signals as generated in the coder. Therefore, since R(I) in equations 5 and 6 was given in terms of the previous output digit, OUT(I−1), these equations may be substituted into equation 7 as A(I) to yield expressions for adaptive delta modulation utilizing PQ step adaptation and double integration.

$$E(I) = IN(I) - [L \cdot R(I-1) + F \cdot DL(I-1) + P \cdot STEP(I-1)] \tag{8}$$

when OUT (I−1) was a logic 0.

$$E(I) = IN(I) - [L \cdot R(I-1) + F \cdot DL(I-1) - Q \cdot STEP(I-1)] \tag{9}$$

when OUT(I−1) was a logic 1.

To distinguish the principles and operation of the present invention insofar as they utilize PQ step adaptation and double integration, it is necessary to consider the operation of combinatorial circuits 117 and 118. Circuits 117 and 118 are characterized by equations which are very similar in form to equations 8 and 9, but which are very different in concept and operation to those equations. In other words, while utilizing the same information as standard delta modulation encoders (the values of P, Q, L, F, and STEP(I−1)), coders incorporating the principles of the present invention utilize that information quite differently, i.e., to produce predictions of alternative error signals for the $I^{th}$ and for the $(I+1)^{th}$ timing period. Thus, rather than merely relying upon the PQ apparatus and double integration apparatus to synthesize a locally generated approximation based upon output digits up to and including the previous output digit OUT(I−1), the present invention utilizes that same apparatus and information along with signals representing hypothetical output signals to produce prediction signals for the $I^{th}$ and the $(I+1)^{th}$ timing period. Whereas the prior art produced a signal E(I) and A(I) in proportion to output signals up to OUT(I−1), the present invention assumes hypothetical values for OUT(I) and OUT(I+1), and in response thereto produces signals R(I) and R(I+1) as well as E(I) and E(I+1). Then, provided with the predicted error for future signals, the encoder more accurately encodes sample IN(I). As was mentioned hereinbefore, the apparatus producing these values is particularly embodied in combinatorial circuits 117, 118, 119, and 120. Combinatorial circuits 117 and 118 produce the R(I) and E(I) signals under assumed values of OUT(I), and combinatorial circuits 119 and 120 produce the values R(I+1) and E(I+1) under hypothetical conditions of output signals OUT(I+1). In a preferred approach, the apparatus of FIGS. 1A and 1B produces signals R(I+1) and E(I+1) only for a portion of all possible output signals.

It is useful to describe in terms of analytical functions the operation of combinatorial circuits 117 and 118 in order to compare them with the standard delta modulation equations as shown in equations 8 and 9. As was previously mentioned, the positive input of each combinatorial circuit 117 and 118 is fed by IN(I), line 102 delivering the sample value IN(I) to positive terminals 137 and 141. Line 104 delivers from integrator 112 the quantity L·R(I) to negative input terminals 138 and 142. That is, since line 104 originates at the output of multiplication circuit 114 and prior to the delay subjected by delay element 135, the quantity on line 104 and, therefore, at input terminals 138 and 142 is the replica R(I) multiplied by the integration feedback factor L at multiplier 114. Negative terminals 139 and 143 of circuits 117 and 118 are similarly fed via line 105 from the first integrator 111. Clearly, line 105 originates at the same point in the first integrator 111 as the line 104 originates in the second integrator 112. Accordingly, the quantity which is applied at negative input terminals 130 and 145 is the integration step of the first integrator DL(I) multiplied by the first integration feedback factor F at multiplier 113. Negative input terminal 140 of combinatorial circuit 117 is coupled to line 106 which, in turn, is connected to multiplication circuit 129. Since multiplier 129 functions to multiply the step size value STEP(I) by the positive adaptation factor, P, the quantity delivered to negative input terminal 140 is equal to P · STEP(I). Obviously the delivery of the step size change P · STEP(I) corresponds to the hypothetical value of OUT(I) equal to a logic 0. In contrast, negative input terminal 144 of combinatorial circuit 118 is coupled to line 108 which in turn is connected to multiplication circuit 130. Since multiplication circuit 130 affords a multiplication of the step size STEP(I) by the factor —Q, its operation corresponds to the hypothetical value of OUT(I) equal to a logic 1. Accumulating these various terms to develop analytical expressions for the operation of circuits 117 and 118, one develops the following equations:

$$E(I) = IN(I) - [L \cdot R(I) + F \cdot DL(I) + P \cdot STEP(I)] \quad (10)$$

for OUT(I) hypothetically being a logic 0, and $$E(I) = IN(I) - [L \cdot R(I) + F \cdot DL(I) - Q \cdot STEP(I) \quad (11)$$

for OUT(I) hypothetically being a logic 1. Inspection of equations 10 and 11 and comparison thereof with equations 8 and 9 shows the principal difference resulting from the hypothetical assumptions made in accordance with the principles of the present invention. Standard delta modulators represented by equations 8 and 9 may be truly based only upon quantities of R(I−1), DL(I−1), and STEP(I−1) since they are dependent only upon output digits up to OUT(I−1). In contrast, the embodiment of FIGS. 1A and 1B produces error signals dependent upon R(I) as well as DL(I) and STEP(I) since they are dependent upon hypothetical values for OUT(I).

In summary, combinatorial circuit 117, which embodies equation 10, produces estimated error signals upon the hypothetical condition of IN(I) being encoded as OUT(I), a logic 0. Similarly, combinatorial circuit 118 embodies equation 11, representing the production of an estimated error signal E(I) upon the hypothetical condition of the input sample IN(I) being encoded as OUT(I), a logic 1.

If the principles of the present invention went no further, but determined the encoded value of OUT(I) merely upon the basis of equations 10 and 11, it would still represent a significant improvement over the prior art in encoders both of the first order and of the higher order types. However, the principles of the present invention go still further and afford error signals E(I+1) based upon hypothetical conditions for the output signals OUT(I+1). It is apparent that four such hypothetical conditions could be developed, since each possible signal OUT(I+1) can be produced for each of the hypothetical values of OUT(I). Accordingly, it is within the potential of the principles of the present invention to produce estimated error signals E(I) under four hypothetical output sequences for OUT(I) and OUT-(I+1): 00, 01, 10, and 11. It has been empirically discovered, however, that it is of little benefit to compute estimated error signals for E(I) under the hypothetical conditions of 00 and 11. That is, if the values for E(I) are computed for the hypothetical cases 01 and 10, it is unnecessary although quite feasible to produce estimated error signals for hypothetical values of 00 and 11 for OUT(I) and OUT(I+1). The reasoning behind this proceeds as follows. The avowed purpose of predictive encoding whereby the encoder considers more than one sampling period in the future is to allow for some sense of anticipation of rapid changes in the analog signal being encoded. That is, a principal problem in predictive coders going merely one sampling period in the future is that they fail to take account of rapid changes in the input signal. Thus, prior art coders were restricted in their response to sudden changes in the input analog signal. If the signal continues to increase over a period of time, the prior art coders generally continue to increase the step size. If, however, after a period of increase, the analog input signal undergoes a sudden decrease, the prior art coders take a period of time to respond thereto. In the time during which the prior art coders are responding, by changing from large increasing step size changes to sufficiently large decreasing step size changes, a significant amount of encoding error results. By considering hypothetical values of 01 and 10, the present invention allows for the consideration at every encoding time of the consequences of a sudden change in the analog signal. Thus, 10 represents an immediate change followed by a continued directional stability, whereas 01 corresponds to a continued stability followed by a sudden directional change. By affording the ability to consider these sudden changes at every timing period, the present invention significantly reduces the difficulty encountered by the prior art encoders of responding to sudden changes. Thus, the encoders embodying the principles of the present invention are notably fast in responding to input signal change, and they therefore significantly reduce the amount of encoding error experienced upon the occurrence of these changes. Empirical data has shown that a consideration of only the 01 and 10 hypothetical output combinations satisfactorily accounts for almost any possible change for the input signal. Thus, while it would be no significant inconvenience also to simulate hypothetical output signals of 11 to 00, such circuitry is found to introduce less improvement in the encoder performance than is deemed worthwhile. Accordingly, the embodiment of FIGS. 1A and 1B computes the hypothetical estimated error signals only for hypothetical values of 01 and 10 for OUT(I) and OUT(I+1).

The apparatus which particularly performs the simulation of the estimated error signals E(I+1) and R(I+1) is located in combinatorial circuits 119 and 120. In addition, to facilitate the calculations, the embodiment of FIGS. 1A and 1B also affords several items of circuitry which merely process the signals delivered to the inputs of FIGS. 119 and 120. This processing circuitry includes a multiplier which affords a multiplication by $L^2$ 147, two addition circuits 148 and 149, the two circuits which perform a multiplication by the quantity L+F 151 and 152.

To appreciate the operation of combinatorial circuits 119 and 120, it is useful to derive expressions analogous to equations 10 and 11. It should first be recognized that the expressions of equations 5 and 6 are generalized expressions for the operation of the apparatus between switch 126 and terminal 136. Accordingly, if the replica which is sought to be reproduced is R(I+1), equations 5 and 6 may be rewritten in terms of R(I), DL(I), and STEP(I). Thus, the expression for R(I+1) may be written as follows:

$$R(I+1) = L \cdot R(I) + F \cdot DL(I) + STEP(I) \quad (12)$$

equation 12 may be further rewritten, however, to place it in terms of R(I−1), DL(I−1), and STEP(I−1) multiplied by P or—Q. This, then, allows for the assumptions of OUT(I+1) being a 1 or a 0. The result produced thereby is the desired R(I+1), the replica at sampling time I+1, under the hypothetical condition of 01 and 10. Making these appropriate substitutions, equation 12 may be expressed as follows:

$$R(I+1) = [L \cdot R(I-1) + F \cdot DL(I-1) + P \cdot STEP(I-1)] + F[F \cdot DL(I-1) + P \cdot STEP(I-1)] + [P \cdot STEP(I-1)] \quad (13)$$

for hypothetical values of OUT(I) = 0 and OUT(I+1) = 1, and $$R(I+1) = L[L \cdot R(I-1) + F \cdot DL(I-1) - Q \cdot STEP(I-1)] + F[F \cdot DL(I-1) - Q \cdot STEP(I-1)] + [- Q \cdot STEP(I-1)] \quad (14)$$

for hypothetical values of OUT(I) = 1 and OUT(I+1) = 0. Clearly, equations 13 and 14 respectively represent the replica R(I+1) for the hypothetical values of 01 and 10, and are expressed in terms of R(I−1), DL(I−1), and STEP(I−1). Thus, by embodying equations 13 and 14 and correlating them with the input sample IN(I+1), $$E(I+1) = IN(I+1) - R(I+1), \quad (15)$$

an estimated error signal E(I+1) is produced, taking into account hypothetical values for OUT(I) and OUT(I+1) of 01 and 10.

Combinatorial circuits 119 and 120 comprise the apparatus which particularly embody equation 15 under the hypothetical conditions accounted for in equations 13 and 14. For convenience of explaining the embodiment of FIGS. 1A and 1B, equations 13 and 14 may be conveniently expressed and combined with equation 15 as follows:

$$E(I-1) = IN(I+1) - [L_2 \, . \, R(I) - P \cdot Q \; STEP\;(I)] - (L+F)\;[F \cdot DL(I) + P \cdot STEP(I)] \quad (16)$$

for hypothetical values of OUT(I) = 0 and OUT(I+1) = 1, and $$E(I+1) = IN(I+1) - [L^2\,R(I) + Q^2\;STEP(I)] - (L+F)\;[F \cdot DL(I) - Q \cdot STEP(I)] \quad (17)$$

for hypothetical values of OUT(I) = 1 and OUT(I+1) = 0.

In the form shown in equations 16 and 17, it is quite apparent how combinatorial circuits 119 and 120 represent the embodiments thereof. The quantities E(I+1) are produced at the outputs 153 and 154 respectively of circuits 119 and 120. The quantity IN(I+1) is delivered to input terminals 145 and 146 on line 101. The quantity $L^2$ multiplied by replica R(I) is delivered by line 103 to negative input terminals 155 and 156. The quantity −P·Q multiplied by STEP(I) is delivered from multiplier 110 to negative input terminal 157 of combine circuit 119. Similarly, the quantity $Q^2$ multiplied by STEP(I) is delivered to negative input terminal 158 of combine circuit 120 from multiplier 180 via line 107. Negative input terminal 159 of combine circuit 119 is coupled to multiplier 151 which affords the function "multiply by the quantity L+F." In particular, the quantity operated upon by multiplier 151 is the output of addition circuit 148, representing the sum of F·DL(I) from line 105 and P times STEP(I) from line 106. Thus, delivered to negative input terminal 159 of combinatorial circuit 119 is the quantity L+F multiplied by the quantity $F \cdot D_{L(I)}$ plus P·STEP(I). Similarly, delivered to negative input terminal 161 of combinatorial circuit 120 is the output of multiply by L+F circuit 152. Multiplier 152 is fed by the output of addition circuit 149; inspection of the inputs of adder 149 reveal that they are respectively the quantity F ·DL(I) from the first integrator 111 via line 105 and the quantity STEP(I) multiplied by −Q at multiplier 130 and delivered via 108. Clearly, then, combinatorial circuits 119 and 120 produce signals which simulate equations 16 and 17, which in turn represent predicted error signals for the sampling period I+1 under the hypothetical conditions of OUT(I) and OUT(I+1) consecutively being 10 and 01.

Combinatorial circuits 117 through 120 therefore each produce predicted error signals under varying hypothetical conditions for the output digits OUT(I) and OUT(I+1). Thus, it is possible that each of these error estimates may yield predictions to some degree associated with one another. For example, combinatorial circuit 117 produces a predicted error E(I) upon the hypothetical condition of OUT(I) being a logic 0. Similarly, combinatorial circuit 119 produces a predicted error E(I+1) under the hypothetical condition of OUT(I) being a logic 0 and OUT(I+1) being a logic 1. Since both predictions deal with errors calculated from the hypothetical value of OUT(I), it is useful somehow to consider both estimates relative to one another in view of the goals sought to be attained by the encoder. Thus, if minimal error during rapid signal changes are deemed more important than tracking accuracy for an immediate increase or decrease, the predicted error E(I+1) should be more heavily weighted than error E(I). On the other hand, it may be desirable to weight E(I) more heavily than E(I+1).

Rectification and weighted averaging circuits are provided for each of the two pairs of combinatorial circuits; averaging circuit 121 and rectification circuit 171 provide rectification and weighted averaging of the two predicted errors with a hypothetical OUT(I) being a logic 0, and weighted averaging and rectification circuits 122 and 172 provide a rectification and weighted averaging of the two predicted error signals with a hypothetical OUT(I) being a logic 1.

Accordingly the averaging and rectification circuits of FIG. 1B provide two functions. First, since the "direction" of the error is unimportant, the rectification enables all signals to be handled on a positive basis. Secondly, each circuit 121 and 122 multiplies each estimated error at its input by an appropriate weighting factor and combines the two weighted values thereof. Thus, the output of circuit 121 represents the net error which is predicted if the signal IN(I) is to be encoded as a logic 0, and the output of averaging circuit 122 represents the net predicted error under the condition of IN(I) being encoded as the logic 1.

Both of these errors are transmitted to a subtract circuit 123. It should be apparent that the smaller of the outputs from circuits 171 and 172 represent the smaller predicted error.

In summary, the output of the averaging circuit 122 in conveyed to the positive input terminal 162 of subtraction circuit 123 and the output of averaging circuit 121 is conveyed to the negative input terminal 163 of subtraction circuit 123. Thus, if the result of the subtraction by circuit 123 is a negative quantity, it indicates that the error resulting from OUT(I) being a logic 0 is larger than the predicted error resulting from OUT(I) being a logic 1. Similarly, if the result of the subtraction by circuit 123 is a positive quantity, it indicates that the error resulting from OUT(I) being a logic 1 is the larger.

Thus, a positive output voltage from limit circuit 164 corresponds to the preferability of encoding OUT(I) as a logic 0, and the negative voltage from limiting circuit 164 corresponds to the preferability of encoding OUT(I) as a logic 1. It is important to recall that a logic 1 has been defined as representing a directional change in the analog signal between sampling periods, and a logic 0 as representing no directional change between samples. It is apparent that this code assignment is in fact the inverse of the code assignment practiced by much of the prior art. Of course, as long as the decoders utilized are designed in accordance with the code assignments made herein, any non-conformity in the codes is immaterial. Nevertheless, it may at times be desirable to change the output digits to a more standard code. For this reason, an alternative output 165 is provided. By means of an exclusive NOR gate 166 and a delay element 167 connected in feedback therewith, the output of limit circuit 164 is converted to a more standard code.

The exclusive NOR function is defined as producing an output of logic 1 only at those times when all inputs are logic 0's or when all inputs are logic 1's. Thus, exclusive NOR gate 166 combined with delay element 167 changes the convention defined herein with respect to logic 1's and 0's: a logic 1 at alternative output 165 represents an increasing signal, and a logic 0 represents a decreasing signal.

To assure the proper sign as well as to synchronize the transmitting encoder with the receiving decoder it is appropriate to determine a particular value for the variable STEP(I) at the system start up time, both in the transmitter and in the corresponding decoder at the receiver. Limits are placed on the values of the signals coming from multiplying circuits 129, 180, 130, and 110 so that any signal which would fall outside the predetermined range is reset to fall within the range. A very small value would be readjusted to minimum value, and a very large value to the maximum value. These circuits therefore serve as limiters as well as multipliers. Thus, STEP(I) at line 109 will initially be at some minimum value determined by the minimum output of multiplier 130. For these purposes, at system start up, switch 126 is connected to terminal 128. Furthermore, if errors in transmission cause the receiver decoder to fall out of track with the coder, the coder will get back into track whenever a series of logic 1's or logic 0's in the transmitted code drives the response of multiplier-limiter circuits 129 or 130 to the limits.

The embodiment of FIGS. 1A and 1B is assembled entirely of components which are well known in the art and the construction of which will be obvious to one skilled in the art. For example, each of the multiplication circuits called for may be embodied by operational amplifiers biased to give the desired gain and equipped with diodes to limit the signal excursion. Similarly, the combinatorial circuits and the subtraction circuit may be made up of a large variety of circuits well known in the art. The rectifying function may be provided by a simple semiconductor rectifier, and the weighted averaging circuit being embodied as a resistive Tee network.

The following table gives values which have been determined to be preferable from the standpoint of operation with a maximum analog signal amplitude of 2550:

TABLE

Min step size = 20 out of 2550

Max step size = 70 to 140 out of 2550

Positive Adaptation Factor P = 1.4

Negative Adaptation Factor Q = 0.7

First Integration Feedback, F = 0.8

Second Integration Feedback, L = 0.96

Since the feedback loop between switch 126 and terminal 136 operate to assemble a replica of the input signal in response to the output digits, it is apparent that the same apparatus may be used independently to function as a decoder for the embodiment of FIGS. 1A and 1B. Thus, if switch 126, delay element 131, multiplication circuits 129 and 130, and integrators 111 and 112 are operated independently but connected exactly as they are in the encoder of FIGS. 1A and 1B, a decoding operation will result, the output of which represents the assembled analog output signal. Also, since the code assignment of FIGS. 1A and 1B is inverted from the standard, an alternative input 168 is provided which is the logical equivalent of the alternative output 165. Alternative input 168 feeds a delay element 169 and an exclusive NOR gate 170. The operation of this alternative input apparatus is inverse to the operation of the aforementioned alternative output apparatus.

The foregoing has attempted to distinguish the principles of the present invention in terms of their operation and in terms of their embodiments. FIGS. 2 and 3 are presented in an effort to show that these functional and structural differences over the prior art give rise to tremendous operational advantages.

Figure 2A:
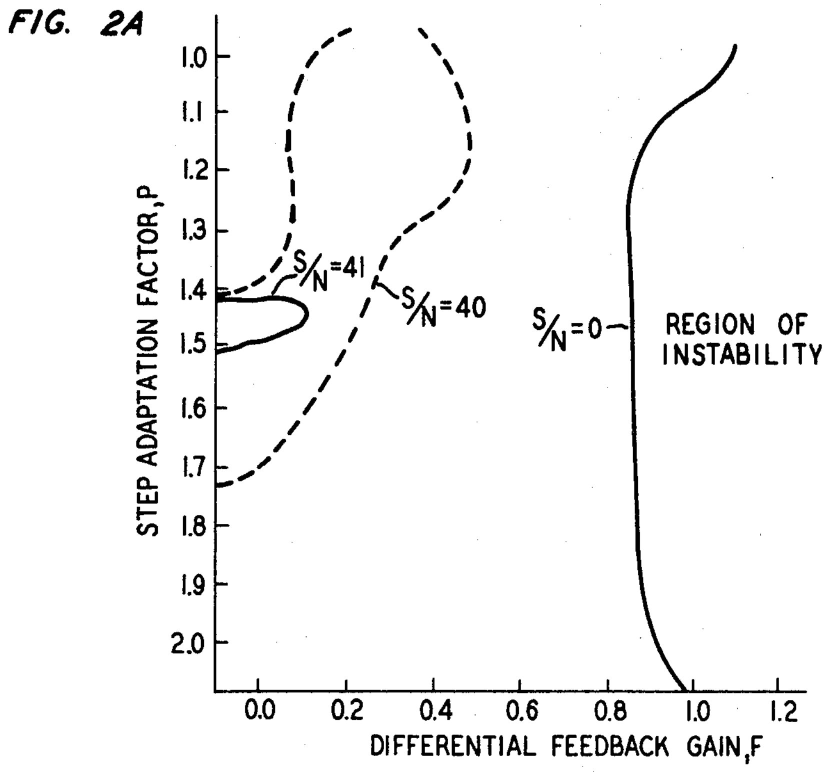
FIGS. 2A and 2B show contour diagrams which compare coders' operations with and without the incorporation of the principles of the present invention.
Figure 2B:
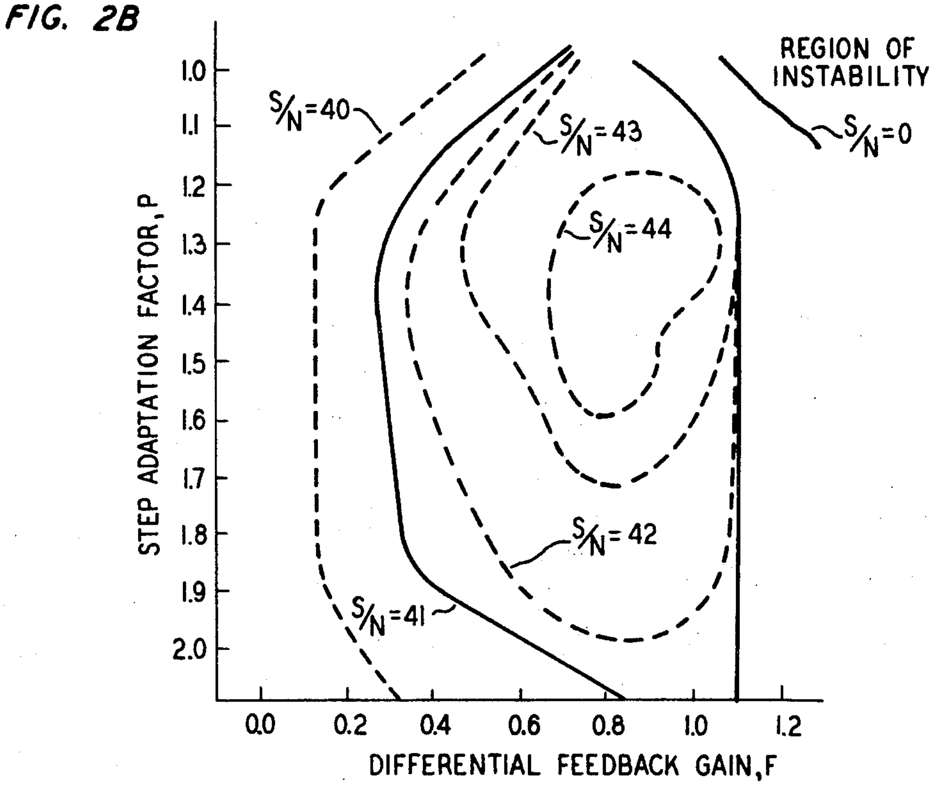

FIGS. 2A and 2B show contour diagrams of signal-to-noise ratios (S/N) for various values of the step adaptation factor P and the integration feedback factor F. More particularly, FIG. 2A shows a signal-to-noise contour diagram for standard adaptive coders featuring PQ adaptation and double integration, and FIG. 2B shows a similar contour diagram for a cover incorporating the principles of the present invention. Both contour diagrams show the step adaptation factor P plotted on the ordinate and the feedback factor F plotted on the abscissa. The contours on each plot represent constant signal-to-noise ratio values. Obviously, a coder which operates at a higher signal-to-noise ratio encodes analog signals with greater accuracy and with considerably more stability. Similarly, an encoder with a signal-to-noise ratio of zero or less is highly unstable.

A comparison of FIGS. 2A and 2B shows that coders employing the principles of the present invention achieve considerably greater signal-to-noise ratio values over much larger areas. In addition, FIG. 2B quite clearly demonstrates the manner in which the principles of the present invention reduce possible instability of the coder. In FIG. 2A, a substantial portion of the plot falls outside the contour S/N = 0, which is the designated reason of instability. In FIG. 2B, however, that the region of instability is almost entirely eliminated. Moreover, for the prior art, FIG. 2A shows that regions with S/N = 40 or greater are quite small, and then only in those regions where the feedback factor F is close to 0. In accordance with the present invention, almost the entire diagram features a signal-to-noise ratio of 40 or greater, and the larger S/N contours are clearly in the larger values of feedback factor F. Thus, FIGS. 2A and 2B demonstrate the superiority of the present invention with respect to signal-to-noise ratio and stability.

FIGS. 3A through 3H show comparisons of wave forms produced by various coders with and without the principles of the present invention. In each case, the same analog signal to be encoded is utilized. This analog signal is designated 301 in each of FIGS. 3A, 3C, 3E, and 3D. Superimposed over the analog signal 301 is an assembled replica of an encoded version thereof. In FIGS. 3A, 3C, 3E, and 3H, these wave forms are designated 302, 303, 304, and 305, respectively. FIGS. 3B, 3D, 3F, and 3H each represent encoded digital versions of the analog signal shown in the immediately preceding figure, and the corresponding replica signals 302 through 305 represent the replica assembled from each encoded signal. Thus, waveform 302 represents a replica assembled from the waveform of FIG. 3B, waveform 303 from the waveform of FIG. 3D, and so on.

Figure 3A:
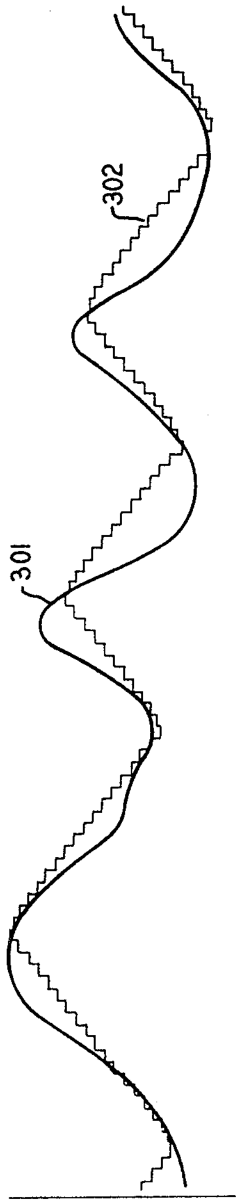
FIGS. 3A through 3H show representations of an encoded analog signal with and without the incorporation of the principles of the present invention.
Figure 3B:
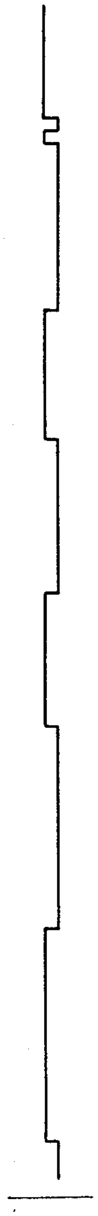
Figure 3C:
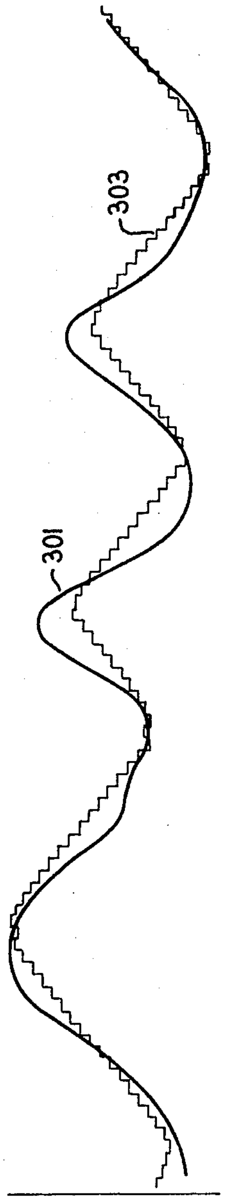
Figure 3D:
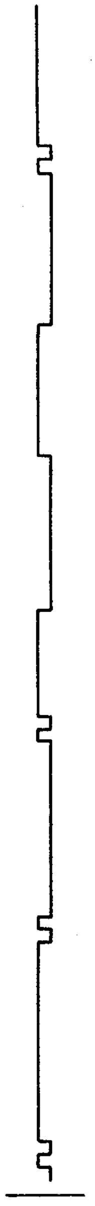
Figure 3E:
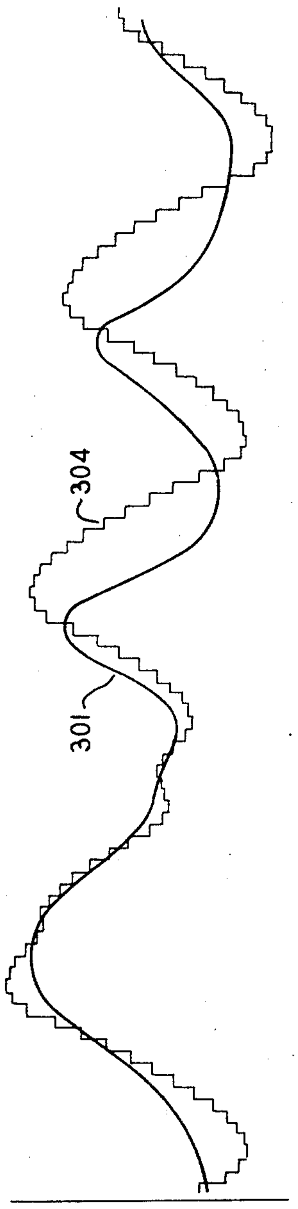
Figure 3F:
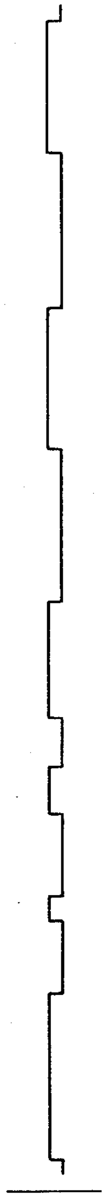
Figure 3G:
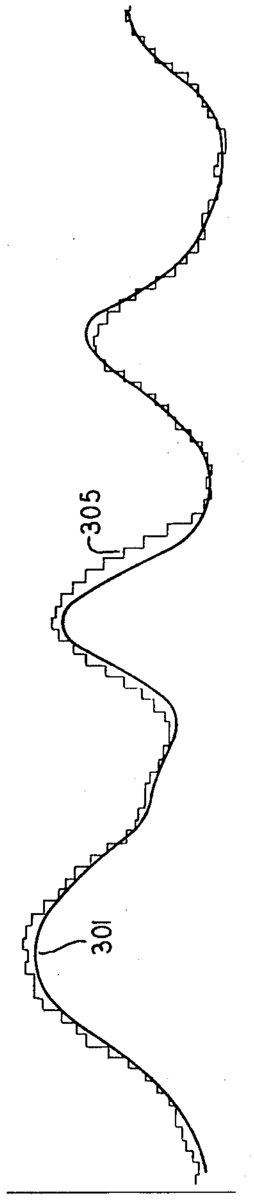
Figure 3H:
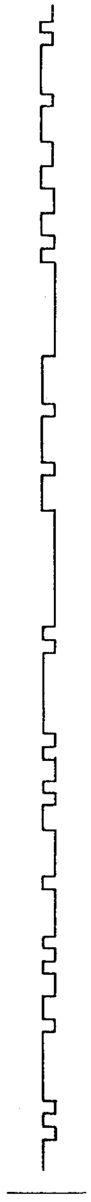

FIGS. 3A through 3D represent coders set with a feedback factor F = 0.4; FIGS. 3A and 3B represent standard double integration coders and FIGS. 3C and 3D represent coders incorporating the principles of the present invention. Clearly, even though F = 0.4 is not the optimum value from the standpoint of the present invention (see FIGS. 2A and 2B) a significant improvement in tracking accuracy is apparent in FIG. 3C. FIGS. 3E through 3H represent encoders with the feedback factor F set to 0.8; FIGS. 3E and 3F represent standard coders while FIGS. 3G and 3H represent coders incorporating the principles of the present invention. From FIGS. 2A and 2B, it was demonstrated that F = 0.8 is a superior value from the standpoint of the present invention, and FIGS. 3E through 3H make this all the more apparent. Particularly at the changes in analog signal 301, replica 305 shows far superior tracking than does replica 304.

In summary, FIGS. 2A and 2B and 3A through 3H quite clearly demonstrate the operational superiority over the prior art of encoders utilizing the principles of the present invention.

In the discussion of FIGS. 1A and 1B, it was stated that a pair of weighted averaging circuits 121 and 122 were necessary to allow for an effective consideration of associated predicted error signals, i.e., those dependent upon the same hypothetical output signals. More particularly, this weighted averaging procedure was utilized in the encoder of FIGS. 1A and 1B because the basic philosophy of conversion utilized by that converter was to attempt to correlate predicted error signals for the next two sampling periods, E(I) and E(I+1). Thus, averaging circuit 121 handled both of those predicted errors under hypothetical conditions of OUT(I) being a logic 0, and circuit 122 functioned similarly for hypothetical OUT(I) values being a logic 1. The embodiment of FIG. 4, in contrast, attempts to correlate only the predicted error two sampling periods in advance, E(I+1), with the input sample two periods in advance, IN(I+1). Thus, the embodiment of FIG. 4 does not require a weighted averaging proceudre, since the quantities corresponding to IN(I) being a hypothetical logic 1 or logic 0 are not computed at all. Rather, the hypothetical output signal values for OUT(I+1) are the only quantities incorporated into and processed by the feedback circuitry of the embodiment of FIG. 4. Accordingly, the embodiment of FIG. 4 does not provide the functions afforded in FIG. 1B by combinatorial circuits 117 and 118. However, combinatorial circuits 419 and 420 provide the same functions afforded in FIG. 1B by combinatorial circuits 119 and 120.

Figure 4:
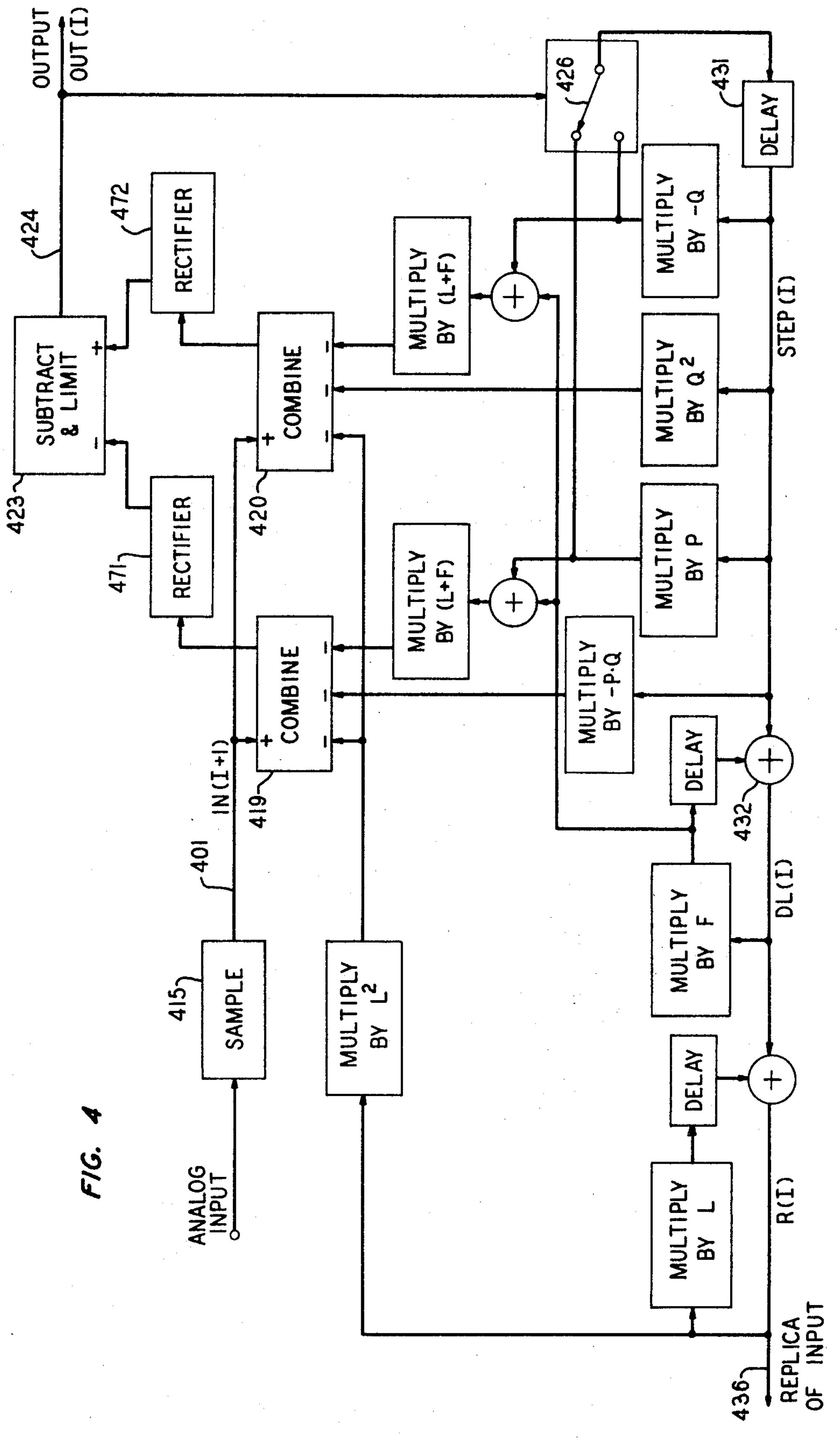
FIG. 4 shows a second illustrative embodiment of the present invention.

A cursory inspection of the embodiment of FIG. 4 indicates great similarity to the embodiment of FIGS. 1A and 1B. Analog input signals are delivered to a sampler 415 which produces samples at line 401 once each sampling period. The delay element 116 from FIG. 1A has been eliminated, however, since the only estimated error E(I+1) is to be synthesized from a direct correlation of IN(I+1) with the replica based upon the hypothetical OUT(I+1). Furthermore, since the subsequent sample IN(I) is not utilized by the embodiment of FIG. 4, neither are the two combinatorial circuits 117 and 118, which in FIG. 1B performed the correlation under hypothetical OUT(I) values. Thus, the sample IN(I+1) is directed only to two combinatorial circuits 419 and 420. Each of the combinatorial circuits 419 and 420 are coupled to various multiplication circuits in the feedback loop located between a switch 426 and terminal 436. The entirety of the apparatus between switch 426 and terminal 436 is seen to be identical to the analogous apparatus in FIGS. 1A and 1B (i.e., between switch 126 and terminal 136). Similarly, its operation is also identical to that of FIGS. 1A and 1B.

Thus, the operation of the two combined circuits 419 and 420 may be described by the following analytical expressions which are seen to be closely related to equations 16 and 17:

$$E(I+1) = IN(I+1) - [L^2 \cdot R(I) - P \cdot . \cdot STEP(I)] -(L+F)[F \cdot DL(I) + P \cdot STEP(I)] \quad (18)$$

for a hypothetical value of OUT(I) = 0 and OUT(I+1) = 1, and $$E(I+1) = IN(I+1) - [L^2 \cdot R(I) + Q^2 STEP(I)] -(L+F)[F \cdot DL(I) -Q \cdot STEP(I)] \quad (19)$$

for a hypothetical value of OUT(I) = 1 and OUT(I+1) = 0.

Thus equation 18 represents the output of combinatorial circuit 419, and equation 19 represents the output of combinatorial circuit 420. Of course, since equations 18 and 19 each represent predicted error and since the encoder of FIG. 4 seeks to minimize predicted error, the magnitude but not the direction thereof is material. Accordingly, a pair of rectifier circuits 471 and 472 respectively rectify the predicted errors from the outputs of combinatorial circuits 419 and 420. A subtract and limit circuit 423 represents the functions performed by subtract circuit 123 and limit circuit 164 of FIG. 1A. Thus, the output digits appear at output terminal 424.

In summary, the embodiment of FIG. 4 represents a simplified version of the encoder of FIGS. 1A and 1B, with the operation of the two being quite similar to one another. In fact, the chief difference between the embodiment of FIG. 4 and the embodiment of FIGS. 1A and 1B is accurately summarized by equations 18 and 19.

Figure 5A:
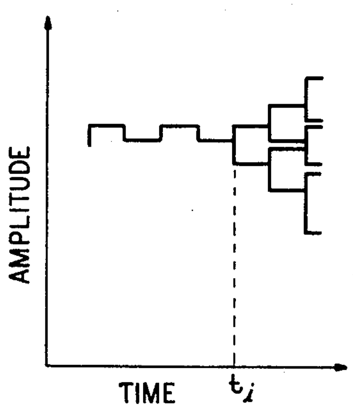
FIGS. 5A through 5D illustrate the possible allocation of quantizing levels in accordance with the present invention.
Figure 5B:
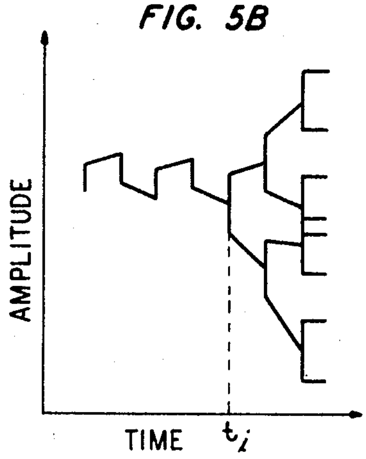
Figure 5D:
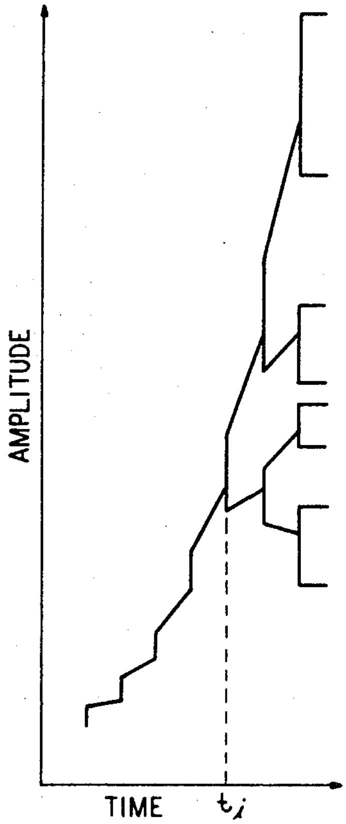
Figure 5C:
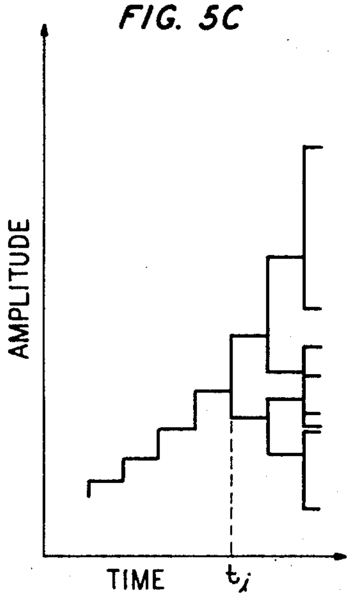

Throughout the foregoing description, it has been shown by means of graphs and waveforms that the operation of encoders featuring the principles of the present invention is far superior to the prior art. To further clarify this superiority, it is useful to consider the distribution of adaptation options which are afforded in accordance with the principles of the coders described. FIGS. 5A and 5B represent the options afforded for one bit adaptive decoders. From any sampling time, $t_i$, to a subsequent time $t_{i+n}$, there are diverging responses by virtue of which the coder is afforded $2^n$ options. FIG. 5A demonstrates the distribution of these options with simple adaptive encoders such as the aforementioned PQ coders. FIG. 5B shows the distribution of options obtained by incorporating double integration with PQ adaptation. FIGS. 5C and 5D show similar response options for a signal which was increasing prior to time $t_i$. It is clear that the accuracy with which a signal can be represented is better when the second step of integration is incorporated. The possible representations in FIGS. 5B and 5D are spread more evenly, and in a range of amplitude which is much move likely to include the forthcoming values of the input signal, unknown at time $t_i$. Without the decision method of this invention, circuits possessing the optional responses shown in FIGS. 5B and 5D could not be used because they would be unstable. The present invention, by anticipating the signal change, makes a better selection of the options possible, but does not change the options per se.

I claim:

1. A predictive encoder for adaptively encoding differences between samples of an analog signal and predicted versions thereof comprising:

means responsive to prior output digits from said encoder and to at least one of said samples for producing at least two estimates of the encoding error to be encountered under the conditions of hypothetical values of output digits at least one sampling period subsequent to the sampling period of a sample being encoded;

means, responsive to said estimate producing means, for determining the smallest one of the estimates of encoding error; and means for quantizing said smallest one of the estimates of encoding error as a digital output signal.

2. An encoder as described in claim 1 wherein said means for producing includes means responsive to prior output digits from said means for quantizing for assembling at least one replica of the input analog signal.

3. An encoder as described in claim 2 wherein said means for assembling includes at least one integrating means for integrating prior output signals into an analog replica signal, and an adaptive mechanism responsive to prior output signals for producing signals which are representative of the most recently encoded output digit.

4. An encoder as described in claim 2 wherein said means for producing estimates comprises a plurality of combinatorial means, each of said combinatorial means assembling an estimated error signal on the basis of input sample values, at least one replica of the input analog signals, and signals representing hypothetical subsequent output signals.

5. An encoder as described in claim 1 wherein said means for determining includes a plurality of means for taking the weighted averages of associated ones of said estimates of encoding error, and means for combining said weighted averages.

6. An encoder as described in claim 1 and further including delay means for simultaneously affording to said means for producing estimates more than one consecutive analog input sample.

7. A predictive encoder for adaptively emcoding the difference between a sample of an analog signal and a predicted version thereof as a single binary output bit comprising:

delay means for subjecting input samples to a time delay of at least one sampling interval, the sample at the output of said delay means being designated a first sample at the input of said delay means being designated a second sample;

means responsive to priorly encoded digital signals for producing approximations of said first and second samples;

means for combining said first and second samples with their respective approximations and with signals representing variations in said respective approximations resulting from the producing of subsequent output digits; and logical means for encoding the first sample as one of the combinations produced by said means for combining.

8. An improved method for generating an encoded representation of the difference between a sample of an analog signal and a predicted version thereof comprising the steps of:

performing at least one integration upon priorly generated output signals, thereby producing an approximation of the next analog sample;

generating a predicted error for the encoding of the next analog sample under the conditions of prospective code options for the next analog sample;

generating predicted error signals for the encoding of the sample subsequent to said next sample under the conditions of prospective output code options for the next sample and the sample subsequent to the next sample;

taking weighted averages of all of said predicted error signals;

combining said weighted averages; and encoding the result of said combined weighted averages.

* * * * *

UNITED STATES PATENT OFFICE
CERTIFICATE OF CORRECTION

Patent No. 3,742,138 Dated June 26, 1973

Inventor(s) Cassius Chapin Cutler

It is certified that error appears in the above-identified patent and that said Letters Patent are hereby corrected as shown below:

Column 1, line 8, change "incode" to --encode--.

Column 3, line 13, change "further" to --future--.

Column 4, line 1, change "are" to --were--.

Column 9, line 34, change "130" to --139--,
change "145" to --143--;
line 60, after "STEP(I)" insert -- ] --.

Column 11, line 11, change "to" to --and--;
line 25, change "the" to --and--.

Column 12, line 20, that part of equation (16) reading "$L_2$ . R(I)" should read -- $L^2$ · R(I) -- .

Column 13, line 50, change "in" to --is--.

Column 17, line 23, that part of equation (18) reading "P · . · STEP(I)" should read -- P · Q · STEP(I) -- .

Column 18, line 11, change "move" to --more--;
line 65, change "emcoding" to --encoding--.

Signed and sealed this 22nd day of January 1974.

(SEAL)
Attest:

EDWARD M. FLETCHER, JR.
Attesting Officer

RENE D. TEGTMEYER
Acting Commissioner of Patents

FORM PO-1050 (10-69)
USCOMM-DC 60376-P69
★ U.S. GOVERNMENT PRINTING OFFICE : 1969 O—366-334.